United States Patent
Huang et al.

(10) Patent No.: US 10,649,499 B1
(45) Date of Patent: May 12, 2020

(54) ELECTRONIC DEVICE AND DETACHABLE BASE

(71) Applicant: HON HAI PRECISION INDUSTRY CO., LTD., New Taipei (TW)

(72) Inventors: Ren-Yi Huang, New Taipei (TW); Chang-Hsun Tu, New Taipei (TW); Yuan-Hung Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/520,425

(22) Filed: Jul. 24, 2019

(30) Foreign Application Priority Data

May 30, 2019 (CN) .......................... 2019 1 0463726

(51) Int. Cl.
*G06F 1/16* (2006.01)
(52) U.S. Cl.
CPC .......... *G06F 1/1669* (2013.01); *G06F 1/1681* (2013.01); *G06F 1/1684* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,028,764 A | * | 2/2000 | Richardson | G06F 1/1616 248/917 |
| 6,504,529 B1 | * | 1/2003 | Inagaki | G06F 1/1616 341/20 |
| 6,781,819 B2 | * | 8/2004 | Yang | G06F 1/162 341/22 |
| 6,788,527 B2 | * | 9/2004 | Doczy | G06F 1/1626 312/208.1 |
| 7,025,274 B2 | * | 4/2006 | Solomon | G06F 1/1669 235/472.01 |
| 9,342,107 B2 | * | 5/2016 | MacDonald | G06F 1/1654 |
| 9,389,644 B2 | * | 7/2016 | Kim | G06F 1/1632 |
| 9,529,737 B2 | * | 12/2016 | McCormack | G06F 13/00 |
| 9,552,020 B2 | * | 1/2017 | Takasu | G06F 1/1669 |
| 9,715,253 B2 | * | 7/2017 | Jung | G06F 1/1681 |
| 9,720,453 B2 | * | 8/2017 | Nelson | G06F 1/1681 |
| 10,025,352 B1 | * | 7/2018 | Gault | G06F 1/1626 |
| 10,203,728 B2 | * | 2/2019 | Koo | G06F 1/1616 |
| 2010/0238620 A1 | * | 9/2010 | Fish | G06F 1/1616 361/679.09 |
| 2014/0355192 A1 | * | 12/2014 | Lin | G06F 1/1669 361/679.17 |
| 2018/0203484 A1 | * | 7/2018 | Lee | G06F 1/1669 |
| 2019/0121445 A1 | * | 4/2019 | Wang | H04M 1/72527 |

* cited by examiner

*Primary Examiner* — Lisa Lea-Edmonds
(74) *Attorney, Agent, or Firm* — ScienBiziP, P.C.

(57) ABSTRACT

An electronic device includes a detachable base and a monitor housing detachably mounted on the detachable base. The detachable base includes a main body, at least one sensor, a keyboard, and a driving circuit. The driving circuit is electrically coupled to the keyboard and the at least one sensor. When the at least one sensor detects the monitor housing placed on the detachable base, the at least one sensor sends a driving signal to the driving circuit, and the driving circuit triggers an input function of the keyboard.

20 Claims, 3 Drawing Sheets

ELECTRONIC DEVICE AND DETACHABLE BASE

FIELD

The subject matter herein generally relates to electronic devices, and more particularly to an electronic device having a detachable base.

BACKGROUND

Generally, a keyboard area of smart phones and tablet computers is small and may not be convenient for use. An external keyboard generally uses a Hall sensor to trigger an input function by electromagnetic induction. However, an external keyboard requires an additional detection circuit and a magnet, which increases a number of components and a weight of the keyboard and increases product cost of the external keyboard.

BRIEF DESCRIPTION OF THE DRAWINGS

Implementations of the present disclosure will now be described, by way of embodiments, with reference to the attached figures.

DETAILED DESCRIPTION

Figure 1:
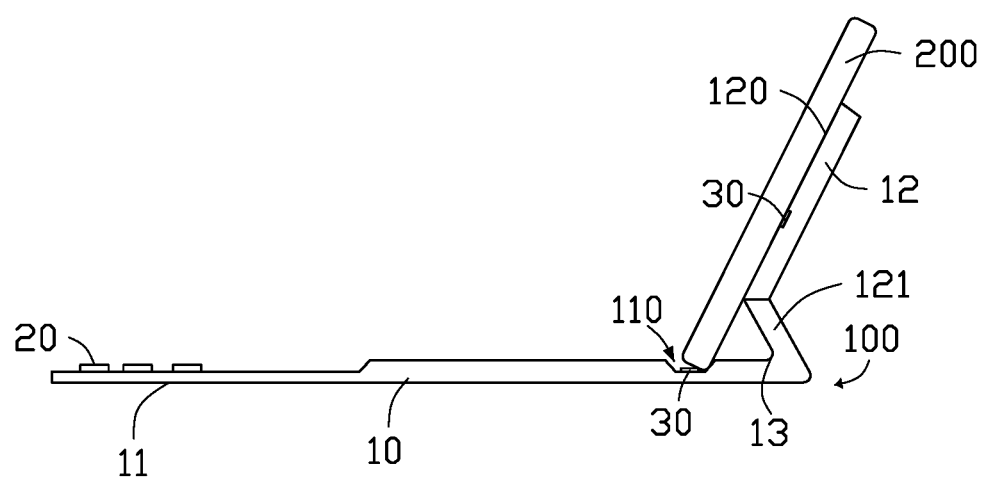
FIG. 1 is a side view of an embodiment of an electronic device including a detachable base and a monitor housing.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of an electronic device 1. The electronic device 1 includes, but is not limited to, a detachable base 100 and a monitor housing 200. The monitor housing 200 is detachably mounted on the detachable base 100. The detachable base 100 includes at least a main body 10 and a keyboard 20. The keyboard 20 can be used as an input device of the electronic device 1 and provides an input function for the electronic device 1.

Figure 2:
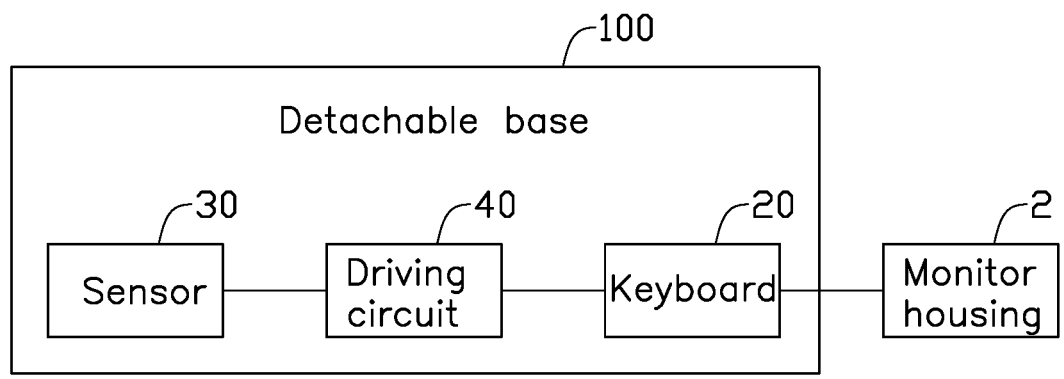
FIG. 2 is a block diagram of the detachable base of the electronic device.

Referring to FIG. 2, in one embodiment, the detachable base 100 includes at least one sensor 30 and a driving circuit 40. The sensor 30 is a capacitive active sensor made of a conductive material for detecting whether the monitor housing 200 is placed on the detachable base 100. The driving circuit 40 triggers an input function of the keyboard 20 when the monitor housing 200 is placed on the detachable base 100.

Specifically, the driving circuit 40 and the sensor 30 are electrically coupled together by electric field induction, and the driving circuit 40 is also electrically coupled to the keyboard 20. When a sensing capacitance of the sensor 30 changes, it is detected that the monitor housing 200 is placed on the detachable base 100, and then a driving signal generated according to the changed sensing capacitance is sent to the driving circuit 40. The driving circuit 40 changes an output voltage when the driving signal is received, thereby turning on the input function of the keyboard 20.

Figure 3:
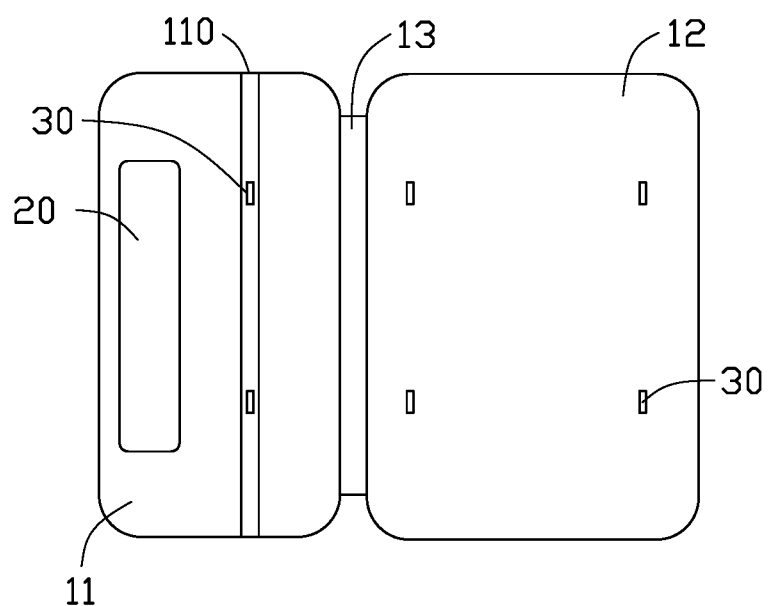
FIG. 3 is a schematic view of the detachable base.

Referring to FIG. 3, in one embodiment, the main body 10 includes at least a carrying portion 11, a support portion 12, and a hinge 13. The keyboard 20 is mounted on the carrying portion 11, and the carrying portion 11 and the support portion 12 can be rotated relative to each other around the hinge 13 to be fixedly positioned relative to each other at preset angles.

As shown in FIGS. 1 and 3, the support portion 12 further includes a contact portion 120 and a folding portion 121. The contact portion 120 is rotatable relative to the folding portion 121 to contact a rear surface of the monitor housing 200. The folding portion 121 is rotatable around the hinge 13 to abut against the monitor housing 200. Thus, the carrying portion 11, the contact portion 120, and the folding portion 121 form a support structure to support the monitor housing 200.

In one embodiment, the carrying portion 11 defines a groove 110 for receiving an end of the monitor housing 200 and preventing the monitor housing 200 from sliding when the monitor housing 200 is placed on the detachable base 100. The detachable base 100 includes a plurality of sensors 30 disposed in the groove 110 for detecting whether the monitor housing 200 is placed on the detachable base 100.

In one embodiment, the plurality of sensors 30 may be disposed on the support portion 12 to detect whether the monitor housing 200 is placed on the detachable base 100.

In one embodiment, the plurality of sensors 30 may be disposed in the groove 110 and on the support portion 12 to detect whether the monitor housing 200 is placed on the detachable base 100.

In one embodiment, the driving circuit 40 scans the plurality of sensors 30 at a preset time interval and determines whether the sensors 30 detect the monitor housing 200 placed on the detachable base 100. In one embodiment, the preset time interval is 50 milliseconds and includes a scan time and an idle time. During the scan time, the driving circuit 40 scans the plurality of sensors 30. During the idle time, the driving circuit 40 stops operating to reduce power consumption. The scan time is 20 milliseconds, and the idle time is 30 milliseconds.

When the sensing capacitances of the plurality of sensors 30 disposed in the groove 110 or on the support portion 12 change, the plurality of sensors 30 detect the monitor housing 200 placed on the detachable base 100. At this time, the sensors 30 send the driving signal to the driving circuit 40. When the driving circuit 40 receives the driving signal, the output voltage changes, and an input function of the keyboard 20 is triggered.

In another embodiment, when the plurality of sensors 30 disposed in the groove 110 or on the support portion 12 detect the monitor housing 200 placed on the detachable base 100, the driving circuit 40 triggers the input function of keyboard 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A detachable base comprising:
a main body:
at least one sensor;
a keyboard; and
a driving circuit electrically coupled to the keyboard and the at least one sensor, wherein:
when the at least one sensor detects a monitor housing placed on the detachable base, the at least one sensor sends a driving signal to the driving circuit, and the driving circuit triggers an input function of the keyboard.

2. The detachable base of claim 1, wherein:
the driving circuit and the at least one sensor are electrically coupled together by electric field induction.

3. The detachable base of claim 1, wherein:
the main body comprises a carrying portion, a support portion, and a hinge;
the keyboard is mounted on the carrying portion;
the carrying portion and the support portion are rotatable relative to each other around the hinge to be fixedly positioned relative to each other at preset angles.

4. The detachable base of claim 3, wherein:
the support portion comprises a contact portion and a folding portion;
the contact portion is rotatable relative to the folding portion to contact a rear surface of the monitor housing;
the folding portion is rotatable around the hinge to abut against the monitor housing;
the carrying portion, the contact portion, and the folding portion form a support structure to support the monitor housing.

5. The detachable base of claim 3, wherein:
the detachable base comprises a plurality of sensors.

6. The detachable base of claim 5, wherein:
the carrying portion defines a groove for receiving an end of the monitor housing;
the plurality of sensors are disposed in the groove for detecting the end of the monitor housing received in the groove.

7. The detachable base of claim 5, wherein:
the plurality of sensors are disposed on the support portion for detecting the monitor housing placed on the detachable base.

8. The detachable base of claim 5, wherein:
the driving circuit scans the plurality of sensors at a preset time interval and determines whether the sensors detect the monitor housing is placed on the detachable base.

9. The detachable base of claim 8, wherein:
the preset time interval is 50 milliseconds.

10. The detachable base of claim 8, wherein:
when sensing capacitances of the plurality of sensors change, the plurality of sensors detect the monitor housing placed on the detachable base, and the sensors send the driving signal to the driving circuit;
when the driving circuit receives the driving signal, an output voltage of the driving circuit changes, and an input function of the keyboard is triggered.

11. An electronic device comprising:
a detachable base; and
a monitor housing detachably mounted on the detachable base; wherein:
the detachable base comprises a main body, at least one sensor, a keyboard, and a driving circuit;
the driving circuit is electrically coupled to the keyboard and the at least one sensor;
when the at least one sensor detects the monitor housing placed on the detachable base, the at least one sensor sends a driving signal to the driving circuit, and the driving circuit triggers an input function of the keyboard.

12. The electronic device of claim 11, wherein:
the driving circuit and the at least one sensor are electrically coupled together by electric field induction.

13. The electronic device of claim 11, wherein:
the main body comprises a carrying portion, a support portion, and a hinge;
the keyboard is mounted on the carrying portion;
the carrying portion and the support portion are rotatable relative to each other around the hinge to be fixedly positioned relative to each other at preset angles.

14. The electronic device of claim 13, wherein:
the support portion comprises a contact portion and a folding portion;
the contact portion is rotatable relative to the folding portion to contact a rear surface of the monitor housing;
the folding portion is rotatable around the hinge to abut against the monitor housing;
the carrying portion, the contact portion, and the folding portion form a support structure to support the monitor housing.

15. The electronic device of claim 13, wherein:
the detachable base comprises a plurality of sensors.

16. The electronic device of claim 15, wherein:
the carrying portion defines a groove for receiving an end of the monitor housing;
the plurality of sensors are disposed in the groove for detecting the end of the monitor housing received in the groove.

17. The electronic device of claim 15, wherein:
the plurality of sensors are disposed on the support portion for detecting the monitor housing placed on the detachable base.

18. The electronic device of claim 15, wherein:
the driving circuit scans the plurality of sensors at a preset time interval and determines whether the sensors detect the monitor housing placed on the detachable base.

19. The electronic device of claim 18, wherein;
the preset time interval is 50 milliseconds.

20. The electronic device of claim 18, wherein:
when sensing capacitances of the plurality of sensors change, the plurality of sensors detect the monitor housing placed on the detachable base, and the sensors send the driving signal to the driving circuit;
when the driving circuit receives the driving signal, an output voltage of the driving circuit changes, and an input function of the keyboard is triggered.

* * * * *